United States Patent
Mohanty et al.

(10) Patent No.: US 10,855,808 B1
(45) Date of Patent: Dec. 1, 2020

(54) INTELLIGENT LOAD BALANCER

(71) Applicant: ServiceNow, Inc., Santa Clara, CA (US)

(72) Inventors: Amitav Mohanty, Hyderabad (IN); Sreenivas Durvasula, Hyderabad (IN)

(73) Assignee: ServiceNow, Inc., Santa Clara, CA (US)

(*) Notice: Subject to any disclaimer, the term of this patent is extended or adjusted under 35 U.S.C. 154(b) by 0 days.

(21) Appl. No.: 16/504,044

(22) Filed: Jul. 5, 2019

(51) Int. Cl.
*H04L 29/08* (2006.01)
*H04L 12/24* (2006.01)

(52) U.S. Cl.
CPC .......... *H04L 67/327* (2013.01); *H04L 41/145* (2013.01); *H04L 67/1021* (2013.01)

(58) Field of Classification Search
None
See application file for complete search history.

(56) References Cited

U.S. PATENT DOCUMENTS

| | | | |
|---|---|---|---|
| 10,554,738 B1* | 2/2020 | Ren | G06F 9/505 |
| 2015/0288571 A1* | 10/2015 | Baughman | H04L 41/16 703/21 |
| 2017/0111233 A1* | 4/2017 | Kokkula | H04L 41/0823 |
| 2018/0026891 A1* | 1/2018 | Vasseur | H04L 47/127 370/235 |

\* cited by examiner

*Primary Examiner* — Jeffrey R Swearingen
(74) *Attorney, Agent, or Firm* — Fletcher Yoder PC (57) ABSTRACT

Techniques for routing requests on a network are described. In accordance with certain aspects, a temporal window is incremented or moved over time to facilitate dynamic routing decisions. The temporal window may be used to project or estimate incoming request traffic based on a suitable probabilistic distribution model, such as a Poisson or Gaussian probability distribution, applied to the window so as to estimate or predict traffic at different times as the window is incremented. Estimated execution times for incoming requests may also be computed so that arrival and completion times of each request or traffic event can be modeled. Processor-implemented routines may be employed to solve the sub-problems defined by the temporal window incoming traffic estimation and the estimated execution times efficiently, allowing the parent or overall routing decision problem to be solved efficiently using dynamic processes, including in real-time contexts.

20 Claims, 5 Drawing Sheets

INTELLIGENT LOAD BALANCER

BACKGROUND

The present disclosure relates generally to load balancing traffic in a networked environment.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In approaches to routing traffic between application nodes within a cloud computing infrastructure, "greedy" algorithms (e.g., algorithms that assign traffic or requests based on a single criterion or condition) are often employed which are easy to implement and convenient. Such "greedy" approaches typically do not achieve platform-wide optimal outcomes due to their focus on singular considerations. However other approaches, e.g., dynamic approaches, that may provide more optimal outcomes across a platform are more computationally intensive and difficult to implement, typically requiring a set of inputs in addition to the request itself to determine an optimal routing solution that is based on more than one factor. Such requirements for dynamic routing typically cannot be met in a real-time scenario.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach employs a temporal window that is incremented or moved over time to facilitate dynamic routing decisions. The temporal window may be used to project or estimate incoming request traffic based on a suitable probabilistic distribution model, such as a Poisson or Gaussian probability distribution, applied to the window so as to estimate or predict traffic at different times as the window is incremented. Estimated execution times for incoming requests may also be computed so that arrival and completion times of each request or traffic event can be modeled. Processor-implemented routines, as described herein, are used to solve the sub-problems defined by the temporal window incoming traffic estimation and the estimated execution times efficiently, allowing the parent or overall routing decision problem to be solved efficiently using dynamic processes, including in real-time contexts.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Approaches to routing traffic between resources (e.g., application nodes) within a cloud computing infrastructure typically employ "greedy" algorithms which typically take into account a single factor or criterion to process a current routing request and are thus easy to implement and convenient. By way of example, a "greedy" algorithm may be a "round robin" approach or an approach whereby the node that has been idle longest is selected. Such "greedy" approaches, however, may fail to take into account other factors such as expected future network traffic load and/or expected requests or traffic load that requires specific resources to perform and typically do not achieve platform-wide optimal outcomes due to lack of consideration of other relevant factors beyond the immediate step or request. Other approaches, e.g., dynamic approaches, that take into account other inputs and factors may provide more optimal outcomes, particularly in a non-local context. However, such dynamic approaches are more computationally intensive and difficult to implement, typically requiring inputs in addition to the request itself to determine an optimal routing solution, which may render such approaches unsuitable for use in a real-time routing scenario.

With the preceding in mind, in one implementation of the present approach, a traffic prediction aspect to dynamic routing may be addressed using a temporal window that is moved or incremented over time. In accordance with certain embodiments, predicted traffic in a given window, at a respective time, and for a respective load or traffic type can be mapped using a suitable probabilistic distribution model (e.g., Poisson, Gaussian, and so forth), thereby providing an estimate or expectation of network events (e.g., requests) of the modeled type within a given time window. In addition, a runtime estimation aspect for a given event may be estimated using suitable statistical models, such as linear regression models, that account for various factors (e.g., inputs, request time, server statistics, and so forth). Processor-based solving of these separate problems may allow for an improved dynamic network traffic routing outcome, including in real-time contexts.

Figure 1:
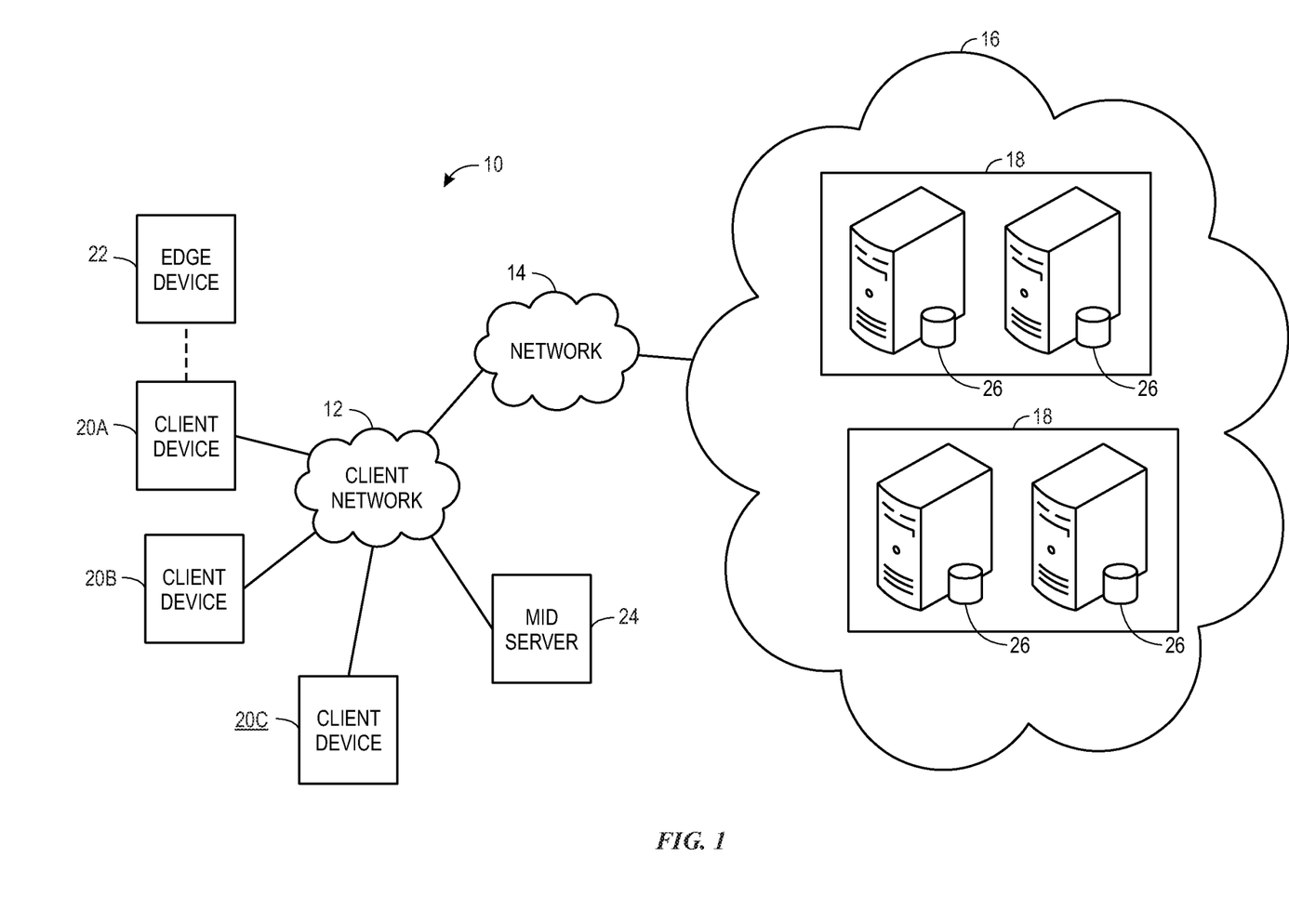
FIG. 1 is a block diagram of an embodiment of a cloud architecture in which embodiments of the present disclosure may operate.

The following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

As illustrated in FIG. 1, one or more load balancers 28 may be provided to route traffic from client devices 20 to cloud platform resources. Such load balancers 28 may be implemented as any suitable combination of hardware, software, and firmware. By way of example, in the depicted scenario, one or more load balancers 28 may be positioned between the client devices 20 and the virtual servers (e.g., application nodes or servers) 26. In this scenario, requests made by the client devices 20 may be routed to respective application nodes or servers in accordance with the techniques discussed herein.

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
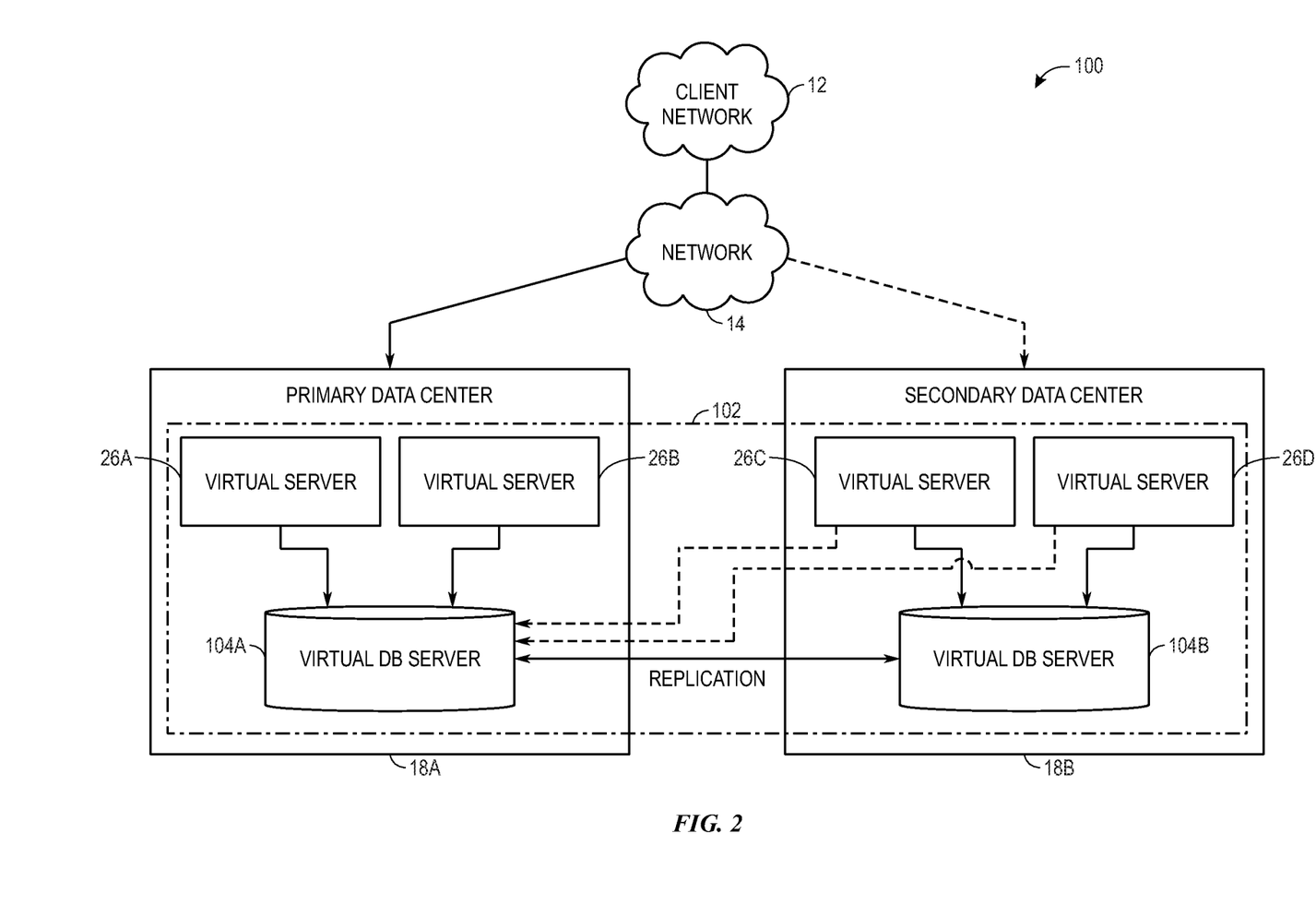
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
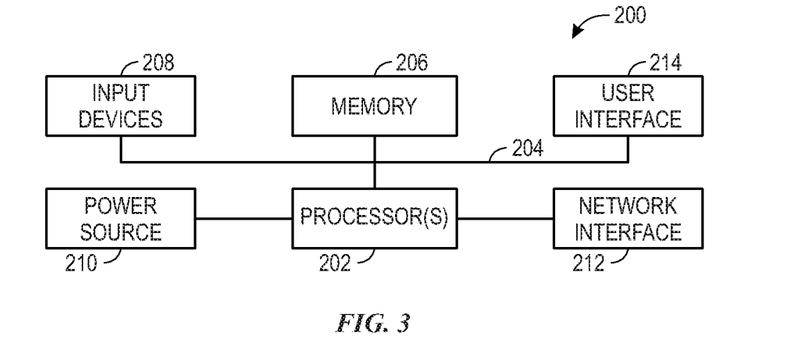
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. In the present context, a load balancer 28 may be provided as a processor-based system as shown in FIG. 3 and may perform operations as discussed herein (e.g., operations related to generating and/or using a priority tree corresponding to predicted network traffic) by executing stored routines on a processor of the processor-based system. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
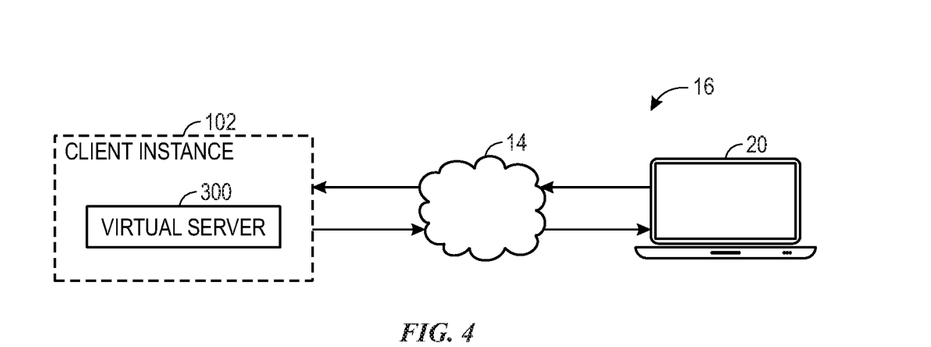
FIG. 4 is a block diagram illustrating an embodiment in which a virtual server supports and enables the client instance, in accordance with aspects of the present disclosure.

Turning to FIG. 4, this figure is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

With the preceding in mind, the present approach may be suitable for use in routing or otherwise managing requests or other network traffic in a networked environment, including client instances of a cloud platform as described herein. By way of example the present approach may be useful for load balancing requests made by web applications in such a cloud platform environment so as to improve request response times and load balancing among a number of application nodes handling such requests.

In contrast to the present approach, conventional load balancing approaches typically operate based on a current state of load and perform a policy based routing of incoming traffic. By way of example, such approaches may employ what is in algorithmic classification characterized as a "greedy" approach which, while potentially locally optimal, may be sub-optimal at the wider (e.g., platform-wide) scale due to only considering a single factor or consideration without consideration of other factors.

With this in mind, the present approach provides a dynamic programming based approach to load balancing that, unlike other dynamic approaches, may be suitable for use in a real-time manner. By way of example, the present approach may make decisions, such as deliberately delaying a response to a request due to an expected future quantity or type of requests (which would be inconsistent with a "greedy" routing approach) that improve better overall performance at the platform or wider scale.

In certain implementations, a dynamic routing approach is employed in which a temporal window having a defined width is employed to make routing decisions. This temporal window may be incremented (i.e., slide) a defined distance or offset at a defined rate. In accordance with this approach, the incoming traffic (e.g., application or other network requests) associated with the temporal window at a given time (e.g., a forward looking temporal window) is predicted, such as by using a suitable probabilistic model. In addition, estimated execution times of the incoming request(s) may be calculated or otherwise determined, such as by using a linear regression model or other suitable statistical model, which may be implemented in a machine learning context. In certain such embodiments various factors may be considered or input to the statistical model (such as, but not limited to, user or system inputs, request time, and/or server statistics). In combination, both the temporal window (i.e., incoming traffic prediction) task and the estimated execution time task may be used to improve dynamic routing performance, including allowing real-time dynamic routing without additional upfront inputs typically used by such dynamic routing approaches.

With respect to the first task related to predicting network or request traffic (referred to at some places herein as "events"), traffic prediction in a given temporal window can be represented by a suitable probabilistic distribution model (e.g., Poisson, Gaussian, or other suitable probability distributions based) which provides a predictive distribution for a given type of traffic (e.g., more than one type of request or event can be modeled for a given time) within a respective temporal window. By way of example, in the context of an implementation in which a Poisson distribution is used to model incoming traffic, a probabilistic model of incoming network traffic of a specific load type is computed for a given temporal window having a fixed width that advances a known increment or offset at a defined or otherwise known rate.

Figure 5:
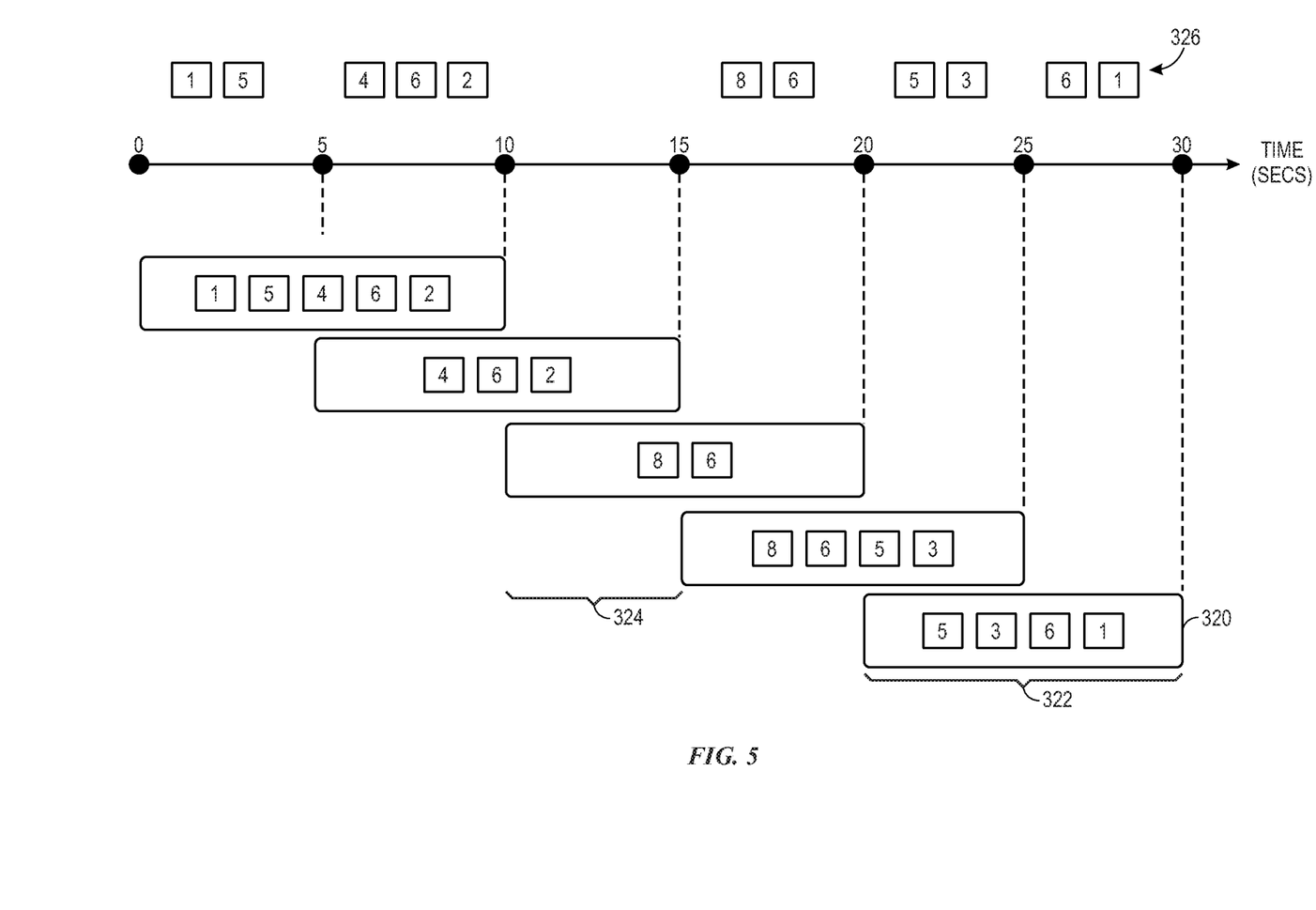
FIG. 5 depicts a sliding temporal window over time in conjunction with predicted events or request within each window of time, in accordance with aspects of the present disclosure.

An example of one such temporal window implementation is shown in FIG. 5 to facilitate explanation. In the depicted example, a window 320 having width (δ) 322 of ten seconds is moved in five second increments (ε) 324 every five seconds (conceptually the window 320 may be considered a single window 320 that is being moved over time or a series of windows 320 that are being generated temporally offset from one another over time). The passage of time is conveyed by the timeline (in seconds) illustrated along the top of the figure.

In the present context, the windows 320 are associated with probabilistic distributions for the purpose of estimating or predicting traffic (e.g., predicted events or requests) at different times along the timeline. In this context, each window 326, based on its associated and parameterized probabilistic distribution, may be used to probabilistically estimate a set of predicted events or requests 326 for a respective corresponding time interval that can be mapped to the timeline as an estimate of traffic (e.g., application requests) within the timeframe of interest.

By way of example, a Poisson distribution may be employed for predicting future network traffic such that incoming traffic of a specific load type is probabilistically computed for a given window 320. This may be represented as:

$$P(k \text{ events in time interval}) = e^{-\lambda_{lt}} \cdot \frac{\lambda_{lt}^k}{k!} \quad (1)$$

where l corresponds to a given load type (e.g., requests) and $\lambda_{lt}$ is the is the average number of l type requests or events coming at the time interval t. Thus, per equation (1), the probability of k (e.g., 1, 2, 3, . . . , n) events in a given time interval is given.

Figure 6:
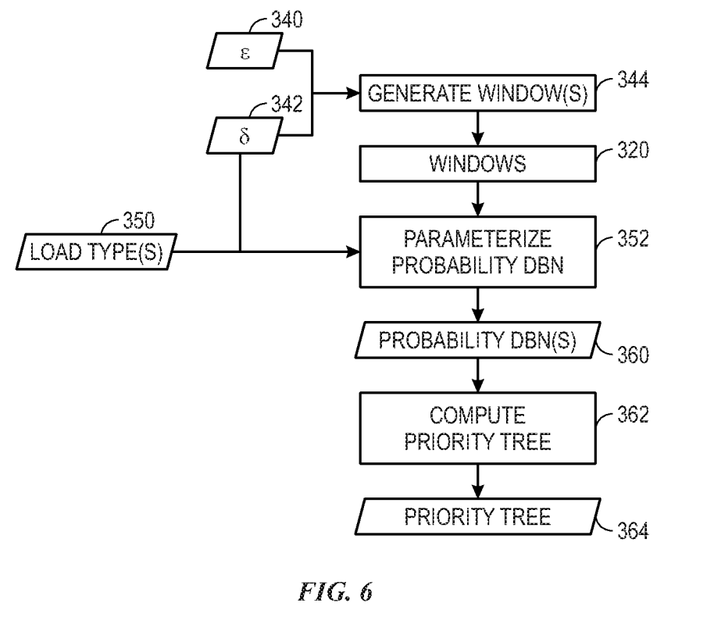
FIG. 6 depicts a process flow of steps and parameters suitable for use in generating a priority tree suitable for routing network traffic, in accordance with aspects of the present disclosure.

With this in mind, and turning to FIG. 6, in certain embodiments a window width δ 342 and increment or offset 340 ε is chosen to generate or otherwise determine (step 344) temporal window(s) 320 to be employed for network traffic prediction. The window width δ 342 may be initially used as the time-interval in the Poisson distribution formula in implementations employing a Poisson distribution to probabilistically model (or more generally be used to parameterize (step 352) one or more probability distributions 360) the network traffic type (i.e., load type 350) in question. For each load type 1350 of interest (e.g., requests corresponding to different types of data, queries, or other interactions, which may in certain implementations be generalized and/or binned as small requests, medium requests, large requests, and so forth), the Poisson formula is separately applied for a time interval δ 342. Different load types (e.g., small, medium, and large) may each have different probabilities. The value of k in the above formulation may then be varied from 1 to n (representing the number of events in the window 320 for which probabilities are being evaluated) and the maximum probability computed to determine the most probable number of events of each given load type l within a respective window 320. A bin packing routine, such as one suitable for use in a dynamic programming context, may be used to compute (step 362) a priority tree 364 (e.g., a hypothetical priority queue) based on the values for $\Delta_{tl}$ computed in this manner and corresponding to the average number of l type requests or events coming at the time interval t. In accordance with such an approach, the priority tree 364 is composed of imaginary nodes with anticipated arrival times of the predicted network traffic (e.g., application requests). Each node may correspond to an application resource (e.g., an application node) to which a resource may be assigned and the order in which nodes should be assigned (i.e., priority).

Figure 7:
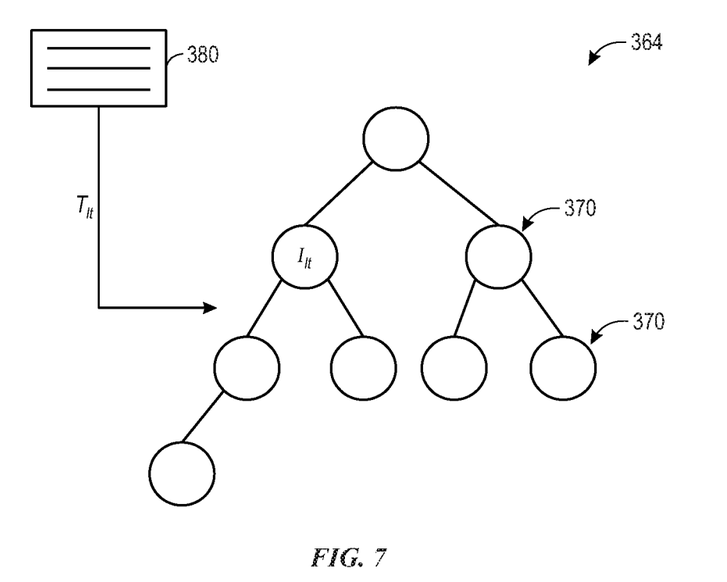
FIG. 7 depicts an example of a priority tree suitable for routing network traffic arriving in a request queue, in accordance with aspects of the present disclosure.

Turning to FIG. 7, an example of the use of such a priority tree 364 in conjunction with a request queue 380 is illustrated to further explain aspects of the present approach. As may be appreciated with respect to the following discussion, real network traffic coming to a load balancer or load balancers 28 (FIG. 1) may be assigned and routed in accordance with the present approach so as to achieve improved routing performance across the cloud platform.

In this example, the priority tree 364 initially consists of a hierarchy of imaginary nodes 370, each defined by a load type request l and a time t at which the request is expected (i.e., $I_{lt}$), as determined in view of the sliding windows 320 and associated probability distributions as discussed herein. As actual network traffic of the modeled load type(s) l arrives at the load balancer at time t (i.e., Tit), it is matched to the closest imaginary node in terms of time t and load type l and the actual traffic event (e.g., request) is routed to the associated resource (e.g., application node). The matched imaginary node is replaced in the tree with a real node indicating the assignment of an actual task (e.g., request) to what was previously a hypothesized or predicted (i.e., prospective) task. Thus, as time passes, nodes 370 of the priority tree 364 are "filled" by incoming actual tasks. Those nodes 370 for which no task arrives in a timely manner (i.e., which are unfilled) are dropped or pruned from the priority queue when their associated time lapses and the priority queue or tree is extended forward in time based on new predicted traffic associated with the incremented temporal window (i.e., based on the probability distribution associated with the window 320 for the tasks l at the time tin question). For example, the priority queue or tree 364 may be incremented (removing lapsed, unassigned nodes 370 and adding new nodes based on predicted traffic) in the same increments E by which the window 320 is moved over time.

A given model may be evaluated for efficacy and efficiency based on the number of nodes 370 that expire (i.e., are not matched to a real traffic request or event). Thus, parameterization of the window 320, parameterization of the probability distribution employed for a given task type l and/or time t, and/or the type of probabilistic distribution (e.g., Poisson, Gaussian, uniform, and so forth) may be adjusted over time so as to minimize expired nodes 370. In this manner, traffic routing over a platform may be improved in a dynamic manner.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud platform, comprising:
a data center comprising a plurality of application servers;
a client network comprising a plurality of client devices, wherein the plurality of client devices generate requests to be processed by the application servers;
a network over which the requests travel between the client network and the data center; and
one or more load balancers configured to route the requests among the application servers using a priority tree based on predicted network events, wherein the one or more load balancers generate and use the priority tree by performing acts comprising:
generating a temporal window having a width corresponding to a time interval;
sliding the temporal window in increments through a series of future times;
for each future time in the series, applying a probabilistic model to the temporal window to determine a probable number of expected requests of a respective request type at the respective future time within the time interval encompassed by the temporal window;
based upon the probable number of expected requests of the respective request type for each future time in the series, executing a bin packing routine to generate the priority tree comprising nodes corresponding to expected requests and expected request types;
assigning requests received over time at the one or more load balancers to a respective node of the priority tree, wherein the expected request and expected request type that correspond to the respective node are matched to the request and a type of the request;
based on the assignment of a respective request to the respective node, routing the respective request to a respective application server; and
updating the probabilistic model based on a number of nodes corresponding to expected requests and expected request types that were not assigned requests.

2. The cloud platform of claim 1, wherein the probabilistic model comprises one of a Poisson probability distribution or a Gaussian probability distribution.

3. The cloud platform of claim 1, wherein the request types correspond to different types of data or queries associated with requests generated by the client devices.

4. The cloud platform of claim 1, wherein the priority tree comprises a temporally ordered set of nodes based on when requests are expected to arrive.

5. The cloud platform of claim 1, wherein the one or more load balancers further perform acts comprising:
updating the priority tree to remove nodes for which a corresponding request was not received and after a time associated with the respective node has passed.

6. The cloud platform of claim 1, wherein the one or more load balancers further perform acts comprising:
updating the priority tree to add nodes as the temporal window slides through the series of future times.

7. The cloud platform of claim 1 wherein assigning requests to respective nodes is based on one or both of an arrival time and request type of the respective request.

8. The cloud platform of claim 1, wherein updating the probabilistic model comprises updating the probabilistic model based on a difference between an estimated execution time and an actual execution time of the requests.

9. A method for balancing requests on a network, comprising the acts of:
sliding a temporal window forward in time in specified time increments, wherein the temporal window has a width corresponding to a time interval;
as the temporal window slides forward in time, determining an expected number of requests for each of one or more request types at each time corresponding to a respective time increment to which the temporal window slides;
executing a bin packing routine to generate a priority tree comprising nodes based on the expected number of requests for each of one or more request types at different future times, wherein each node corresponds to an expected request of a respective request type at a future time;
as requests are received over time, assigning each request to a respective node of the priority tree, wherein an expected request and expected request type that correspond to the respective node are matched to the request and a type of the request, and wherein assignment of a respective request corresponds to the respective request being routed to a network resource associated with the respective node; and
updating the determination of the expected number of requests based on a number of nodes not being assigned requests.

10. The method of claim 9, wherein the network is part of a client instance on a cloud platform.

11. The method of claim 9, wherein determining the expected number of requests for each of one or more request types at each time comprises applying a probabilistic model to the temporal window at each time.

12. The method of claim 11, wherein the probabilistic model comprises one of a Poisson probability distribution or a Gaussian probability distribution.

13. The method of claim 9, wherein the one or more request types comprise requests for different types of data or requests generated by different queries by client devices on the network.

14. The method of claim 9, wherein the priority tree comprises a temporally ordered set of nodes based on when requests are expected to arrive.

15. The method of claim 9, further comprising updating the priority tree as the temporal window is moved forward in time.

16. A load balancer, comprising:
- a processing component configured to execute stored routines; and
- a memory component configured to store executable routines, wherein the executable routines, when executed by the processing component, cause the processing component to perform acts comprising:
  - sliding a temporal window forward in time in specified time increments, wherein the temporal window has a width corresponding to a time interval;
  - as the temporal window slides forward in time, determining an expected number of requests for each of one or more request types at each time corresponding to a respective time increment to which the temporal window slides;
  - executing a bin packing routine to generate a priority tree comprising nodes based on the expected number of requests for each of one or more request types at different future times, wherein each node corresponds to an expected request of a respective request type at a future time;
  - as requests are received over time, assigning each request to a respective node of the priority tree, wherein an expected request and expected request type that correspond to the respective node are matched to the request and a type of the request, and wherein assignment of a respective request corresponds to the respective request being routed to a network resource associated with the respective node; and
  - updating the determination of the expected number of requests based on a number of nodes not being assigned requests.

17. The load balancer of claim 16, wherein the load balancer is configured to route requests from a plurality of client devices within a client instance to a plurality of application servers in the client instance.

18. The load balancer of claim 16, wherein determining the expected number of requests for each of one or more request types at each time comprises applying a probabilistic model to the temporal window at each time.

19. The load balancer of claim 18, wherein the probabilistic model comprises one of a Poisson probability distribution or a Gaussian probability distribution.

20. The load balancer of claim 16, wherein the executable routines, when executed by the processing component further cause the processing component to perform acts comprising:
- updating the priority tree as the temporal window is moved forward in time.

* * * * *